(12) United States Patent
Letavic et al.

(10) Patent No.: US 11,828,984 B2
(45) Date of Patent: Nov. 28, 2023

(54) THERMAL MANAGEMENT OF AN OPTICAL COMPONENT FOR TEMPERATURE CONTROL

(71) Applicant: GlobalFoundries U.S. Inc., Malta, NY (US)

(72) Inventors: Theodore Letavic, Putnam Valley, NY (US); Yusheng Bian, Ballston Lake, NY (US); Hemant Dixit, Halfmoon, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 74 days.

(21) Appl. No.: 17/679,431

(22) Filed: Feb. 24, 2022

(65) Prior Publication Data
US 2023/0266533 A1     Aug. 24, 2023

(51) Int. Cl.
*G02B 6/122* (2006.01)
*G02B 6/12* (2006.01)

(52) U.S. Cl.
CPC .. *G02B 6/1228* (2013.01); *G02B 2006/12135* (2013.01)

(58) Field of Classification Search
CPC .............................. G02B 6/122; G02B 6/1228
See application file for complete search history.

(56) References Cited

U.S. PATENT DOCUMENTS

| 6,847,748 | B2 | 1/2005 | Benzoni et al. |
| 9,711,534 | B2 | 7/2017 | Liang et al. |
| 2020/0192010 | A1* | 6/2020 | Olson ............ H01J 37/31 |
| 2023/0083198 | A1* | 3/2023 | Bian ............ G02B 6/4283 |
| | | | 385/11 |

FOREIGN PATENT DOCUMENTS

| AU | 2003278910 A1 | 5/2004 |
| EP | 3309911 A2 | 4/2018 |
| JP | 2007078861 A | 3/2007 |

OTHER PUBLICATIONS

Dixit, Hemant et. al., "Photonic Devices Integrated With Thermally Conductive Layers" filed on Jan. 27, 2022 as a U.S. Appl. No. 17/649,191.
K. Giewont et al., "300-mm Monolithic Silicon Photonics Foundry Technology," in IEEE Journal of Selected Topics in Quantum Electronics, vol. 25, No. 5, pp. 1-11, Art No. 8200611, doi: 10.1109/JSTQE.2019.2908790 (Sep.-Oct. 2019).

(Continued)

*Primary Examiner* — Michael P Mooney
(74) *Attorney, Agent, or Firm* — Thompson Hine LLP; Anthony Canale

(57) ABSTRACT

Structures including an optical component and methods of fabricating a structure including an optical component. The structure includes a substrate, an optical component including a waveguide core, and a back-end-of-line stack including a heat spreader layer. The optical component is positioned in a vertical direction between the substrate and the back-end-of-line stack. The waveguide core contains a first material having a first thermal conductivity, and the heat spreader layer contains a second material having a second thermal conductivity that is greater than the first thermal conductivity of the first material.

20 Claims, 4 Drawing Sheets

(56) References Cited

OTHER PUBLICATIONS

Y. Bian et al., "Monolithically integrated silicon nitride platform," 2021 Optical Fiber Communications Conference and Exhibition (OFC), pp. 1-3 (2021).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

C. Dory et al., "Inverse-designed diamond photonics," Nature Communications, 10, 3309. https://doi.org/10.1038/s41467-019-11343-1 (2019).

R. R. Grote et al., "Single-mode optical waveguides on native high-refractive-index substrates," APL Photonics 1, pp. 071302-1-071302-6; https://aip.scitation.org/doi/10.1063/1.4955065 (2016).

Leech, Patrick & Reeves, Geoffrey & Holland, Anthony. "Reactive ion etching of CVD diamond in CF4/O2, O2 and O2/Ar plasmas," MRS Online Proceeding Library Archive. 622. 361-366. 10.1557/PROC-622-T6.36.1 (2000).

H. Dixit et al., "Optical Components With Enhanced Heat Dissipation" filed on Feb. 24, 2022 as a U.S. Appl. No. 17/679,405.

Y. Bian et al., "Thermally-Conductive Features Positioned Adjacent to an Optical Component" filed on Feb. 24, 2022 as a U.S. Appl. No. 17/679,470.

\* cited by examiner

THERMAL MANAGEMENT OF AN OPTICAL COMPONENT FOR TEMPERATURE CONTROL

BACKGROUND

The disclosure relates to photonics chips and, more specifically, to structures including an optical component and methods of fabricating a structure including an optical component.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected with another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to irreversible power-related damage because of poor power handling capability, which adversely impacts reliability. Particularly susceptible to power-related damage are edge couplers that include silicon waveguide cores. At high optical input powers, non-linear absorption effects in silicon waveguide cores may result in severe thermal heating and even physical melting of the waveguide core due to excessively high temperatures.

Improved structures including an optical component and methods of fabricating a structure including an optical component are needed.

SUMMARY

In an embodiment of the invention, a structure includes a substrate, an optical component including a waveguide core, and a back-end-of-line stack including a heat spreader layer. The optical component is positioned in a vertical direction between the substrate and the back-end-of-line stack. The waveguide core comprises a first material having a first thermal conductivity, and the heat spreader layer comprises a second material having a second thermal conductivity that is greater than the first thermal conductivity of the first material.

In an embodiment of the invention, a structure includes an optical component having a waveguide core with a plurality of exterior surfaces and a heat spreader layer on the plurality of exterior surfaces of the waveguide core. The waveguide core comprises a first material having a first thermal conductivity, and the heat spreader layer comprises a second material having a second thermal conductivity that is greater than the first thermal conductivity.

In an embodiment of the invention, a method includes forming a heat spreader layer, and forming an optical component that is positioned in a vertical direction between a substrate and the heat spreader layer. The optical component includes a waveguide core, the waveguide core comprises a first material having a first thermal conductivity, and the heat spreader layer comprises a second material having a second thermal conductivity that is greater than the first thermal conductivity.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
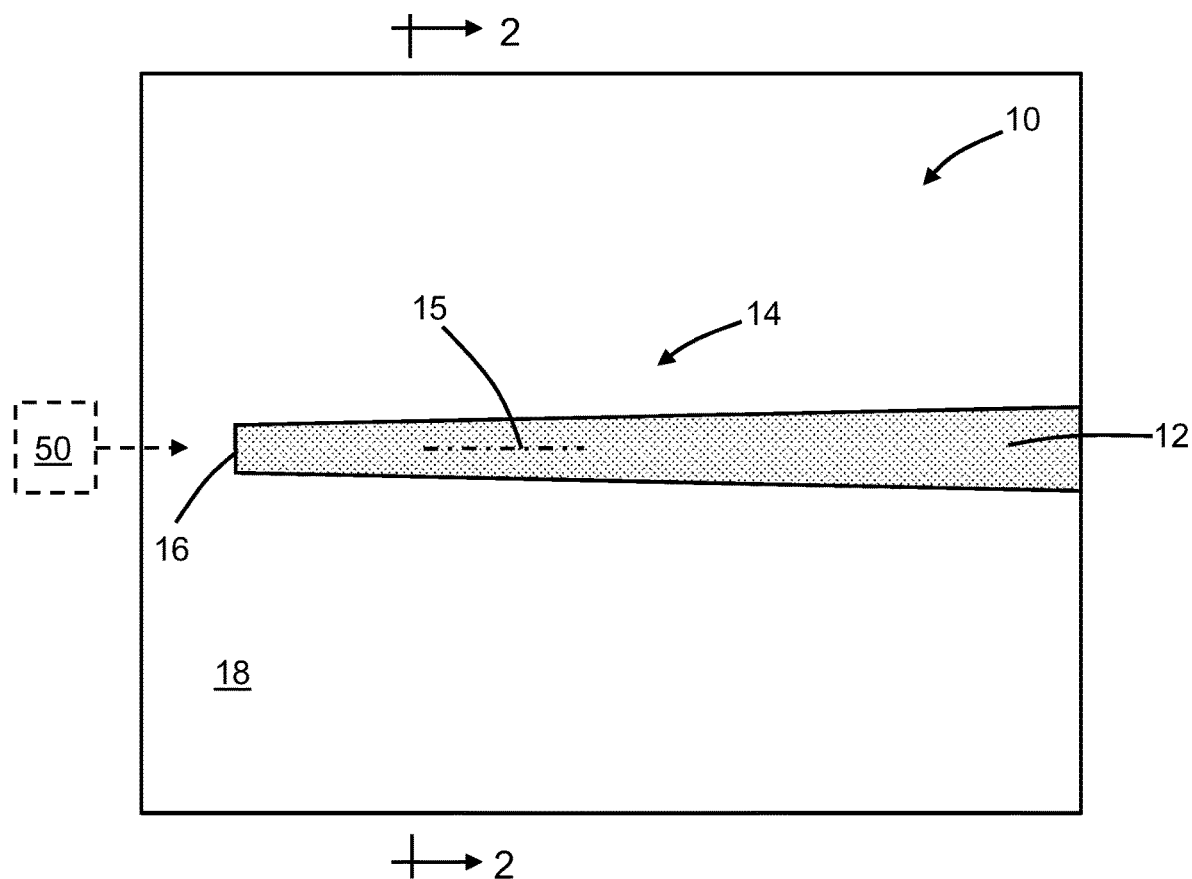
FIG. 1 is a top view of a structure at an initial fabrication stage of a processing method in accordance with embodiments of the invention.
Figure 2:
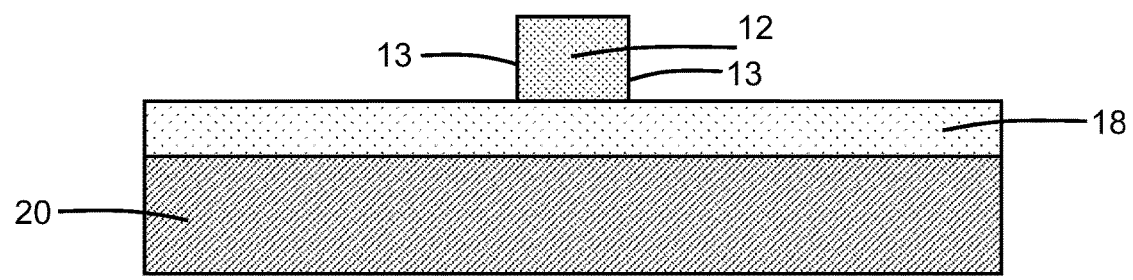
FIG. 2 is a cross-sectional view of the structure taken generally along line 2-2 in FIG. 1.

With reference to FIGS. 1, 2 and in accordance with embodiments of the invention, a structure 10 includes a waveguide core 12 as an optical component. In a representative embodiment, the waveguide core 12 may be an edge coupler in which the waveguide core 12 includes an inverse taper 14 and has an end surface defining a facet 16. The inverse taper 14 increases in width W1 with increasing distance from the facet 16. An inverse taper refers to a tapered section of a waveguide core characterized by a gradual increase in width along a mode propagation direction. The waveguide core 12 may be aligned along a longitudinal axis 15, and the waveguide core 12 may have exterior surfaces 13 including a top surface and opposite sidewalls that converge at the facet 16.

The waveguide core 12 may be positioned over a dielectric layer 18 and a substrate 20. In an embodiment, the dielectric layer 18 may be comprised of a dielectric material, such as silicon dioxide, and the substrate 20 may be comprised of a semiconductor material, such as single-crystal silicon. In an embodiment, the dielectric layer 18 may be a buried oxide layer of a silicon-on-insulator substrate, and the dielectric layer 18 may separate the waveguide core 12 from the substrate 20. The waveguide core 12 may be comprised of a semiconductor material, such as single-crystal silicon. In an embodiment, the waveguide core 12 may be formed by patterning a single-crystal silicon device layer of a silicon-on-insulator substrate with lithography and etching processes, and the dielectric layer 18 may operate as an etch stop when patterning the waveguide core 12.

In the representative embodiment, the waveguide core 12 is embodied in a ridge waveguide core. In an alternative embodiment, the waveguide core 12 may be embodied in a rib waveguide core. In an alternative embodiment, the waveguide core 12 may be embodied in a slot waveguide core. In the representative embodiment, the waveguide core 12 is linear or straight. In an alternative embodiment, the waveguide core 12 may be curved. In an alternative embodiment, the waveguide core 12 may be non-tapered. In embodiments, the waveguide core 12 may be part of an optical component such as a polarization mode converter, an optical coupler, a multi-mode interference region, etc.

Figure 3:
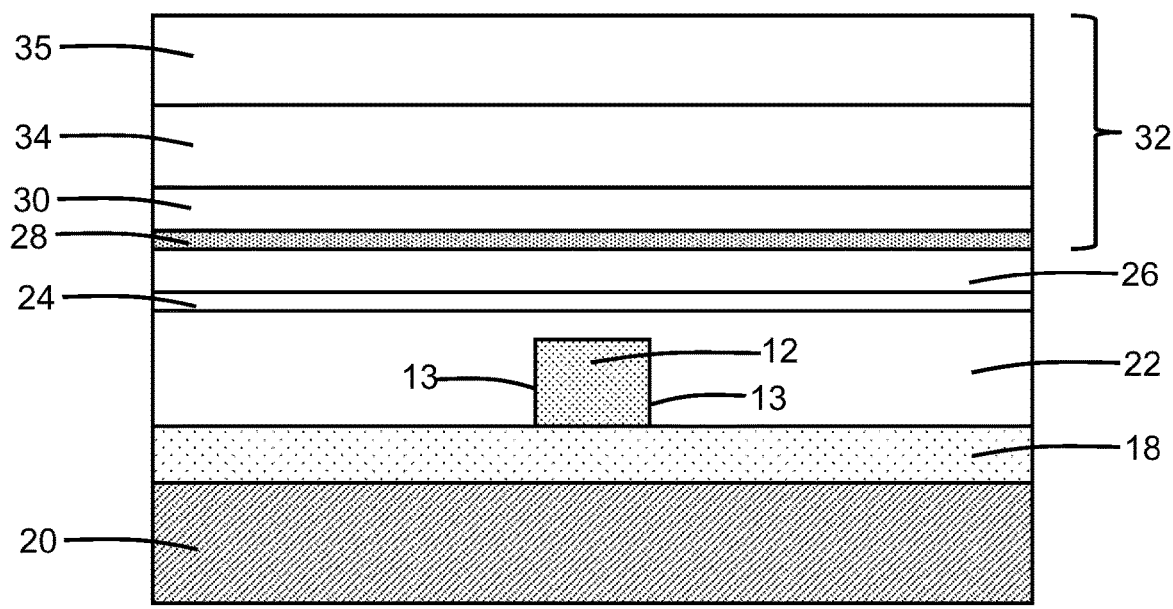
FIG. 3 is a cross-sectional view of the structure at a fabrication stage of the processing method subsequent to FIG. 2.

With reference to FIG. 3 in which like reference numerals refer to like features in FIGS. 1, 2 and at a subsequent fabrication stage, dielectric layers 22, 24, 26 are formed in a layer stack over the waveguide core 12 and dielectric layer 18. The dielectric layer 22 and the dielectric layer 26 may be comprised of a dielectric material, such as silicon dioxide, and the dielectric layer 24 may be comprised of a dielectric material, such as silicon nitride. In an alternative embodiment, the dielectric layer 24 may be omitted from the layer stack.

A back-end-of-line stack 32 includes a heat spreader layer 28 that is formed on the layer stack including the dielectric layers 22, 24, 26. The heat spreader layer 28 is positioned to overlap with the waveguide core 12. In an embodiment, the heat spreader layer 28 may fully overlap with the waveguide core 12. In an embodiment, the heat spreader layer 28 may partially overlap with the waveguide core 12.

The heat spreader layer 28 may be comprised of a material with a comparatively-high thermally conductivity in comparison to the waveguide core 12 and the dielectric layers 22, 24, 26. In an embodiment, the material of the heat spreader layer 28 may be an inorganic material, such as diamond. In an embodiment, the material of the heat spreader layer 28 may be characterized by a thermal conductivity near room temperature that is significantly greater than the thermal conductivity near room temperature of the material constituting the waveguide core 12. In an embodiment, the material of the heat spreader layer 28 may be characterized by a thermal conductivity near room temperature that is significantly greater than the thermal conductivity near room temperature of the material constituting any of the dielectric layers 22, 24, 26. In an embodiment, the material of the heat spreader layer 28 may be characterized by a thermal conductivity near room temperature that is significantly greater than the thermal conductivity near room temperature of silicon dioxide (i.e., about 1.3 W/m-K). In an embodiment, the material of the heat spreader layer 28 may be characterized by a thermal conductivity near room temperature that is significantly greater than the thermal conductivity near room temperature of copper (i.e., about 400 W/m-K). In an embodiment, the material of the heat spreader layer 28 may be characterized by a thermal conductivity near room temperature significantly greater than the thermal conductivity near room temperature of silicon (i.e., about 150 W/m-K). In an embodiment, the material of the heat spreader layer 28 may be characterized by a thermal conductivity near room temperature that is greater than 1000 W/m-K. For example, diamond as a candidate material for the heat spreader layer 28 is characterized by a thermal conductivity near room temperature of about 2000 W/m-K to about 2400 W/m-K. The high thermal conductivity of the material of the heat spreader layer 28 promotes heat flow away from the waveguide core 12 such that, during operation, the waveguide core 12 may exhibit a reduced operating temperature.

In an embodiment, the heat spreader layer 28 may be deposited by chemical vapor deposition. In an embodiment, the heat spreader layer 28 may have a thickness that provides a sufficient thermal mass to support the spreading of heat away from the waveguide core 12. In an embodiment, the heat spreader layer 28 may be planar layer with a uniform thickness between planar top and bottom surfaces. In an embodiment, the heat spreader layer 28 may have a thickness ranging from about 10 nanometers to about 200 nanometers.

The back-end-of-line stack 32 may further include a dielectric layer 30 formed on the heat spreader layer 28. The dielectric layer 30 may be comprised of a dielectric material, such as silicon dioxide. The heat spreader layer 28 is positioned in a vertical direction between the dielectric layer 26 and the dielectric layer 30. As a result, the heat spreader layer 28 is arranged in a vertical direction between adjacent dielectric layers 26, 30 of lower thermal conductivity.

The back-end-of-line stack 32 may further include additional dielectric layers 34, 35 each comprised of a dielectric material, such as silicon dioxide or silicon nitride, over the dielectric layer 30. In an embodiment, the heat spreader layer 28 may be considered to be formed in a metallization level of the back-end-of-line stack 32 that is closest to the waveguide core 12.

Light (e.g., laser light) may be directed from a light source 50 (FIG. 1) toward the facet 16 of the waveguide core 12. The light may have a given wavelength, intensity, mode shape, and mode size, and the edge coupler furnishing the representative optical component may provide spot size conversion for the light. In an embodiment, the light source 50 may be a semiconductor laser, and the semiconductor laser may be positioned inside a cavity formed in the substrate 20 and attached to the substrate 20.

The heat spreader layer 28 may act as a heat spreader for dissipating heat generated in the waveguide core 12 during operation, while imparting a minimum perturbation on the optical mode of the laser light being guided by the waveguide core 12 and on the light-guiding properties of the waveguide core 12. The heat spreader layer 28 may be effective to prevent permanent damage to the waveguide core 12 arising from high-power laser light, such as laser light with a power in a range of 100 milliwatts to 200 milliwatts. For example, the heat spreader layer 28 may effectively mitigate hotspots in the waveguide core 12 caused by high-power laser light such that the waveguide core 12 can operate below an acceptable temperature limit. The heat spreader layer 28 may be particularly effective in providing cooling for a silicon waveguide core 12 that experiences elevated heating due to non-linear light absorption at high powers. The heat spreader layer 28 may relax restrictions on the laser power level and lead to fewer limitations on system-level performance.

The structure 10, in any of its embodiments described herein, may be integrated into a photonics chip that includes electronic components and additional optical components. For example, the electronic components may include field-effect transistors that are fabricated by CMOS processing.

Figure 4:
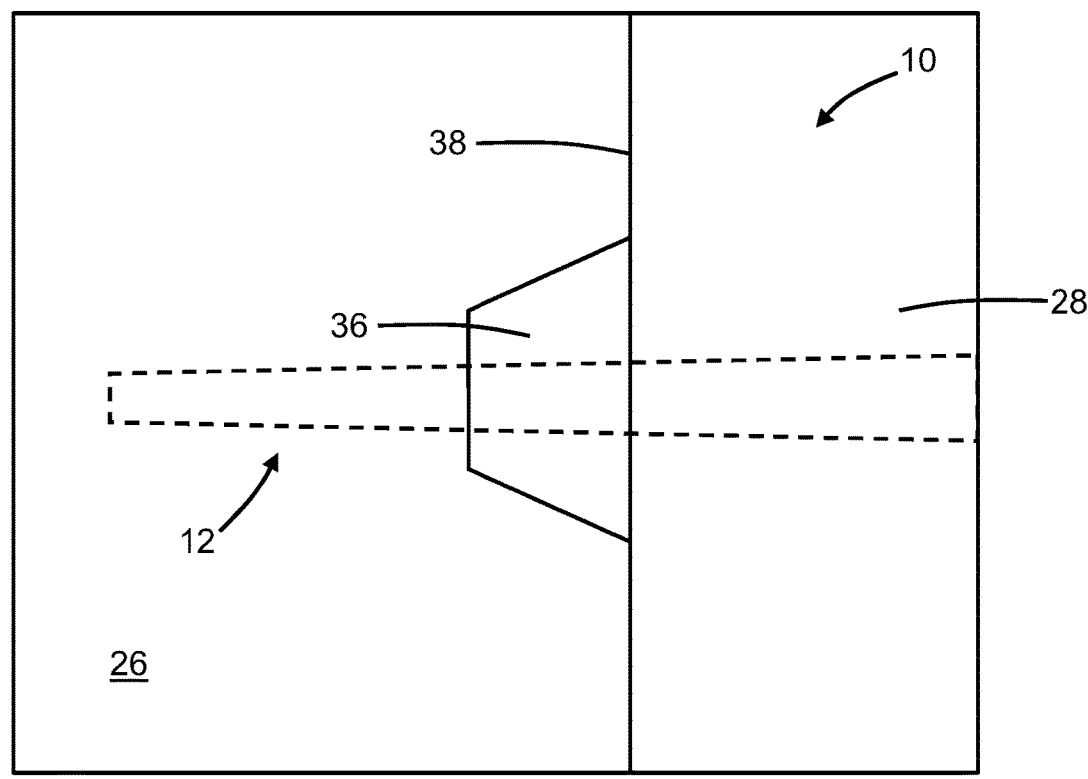
FIG. 4 is a top view of a structure in accordance with alternative embodiments of the invention.

With reference to FIG. 4 and in accordance with alternative embodiments of the invention, the heat spreader layer 28 may be patterned by lithography and etching processes to include an edge 38 and to define a shape, such as a taper 36, that is located along the edge 38 over a portion of the waveguide core 12. The heat spreader layer 28 may be positioned to overlap with a section of the waveguide core 12, but not with another adjacent section of the waveguide core 12. As a result, the heat spreader layer 28 only partially overlaps with the waveguide core 12 in contrast to the full overlap that exists in FIG. 3. The taper 36 may promote an adiabatic transition from the section of the waveguide core 12 that is not overlapped by the heat spreader layer 28 to the section of the waveguide core 12 that is overlapped by the heat spreader layer 28.

Figure 5:
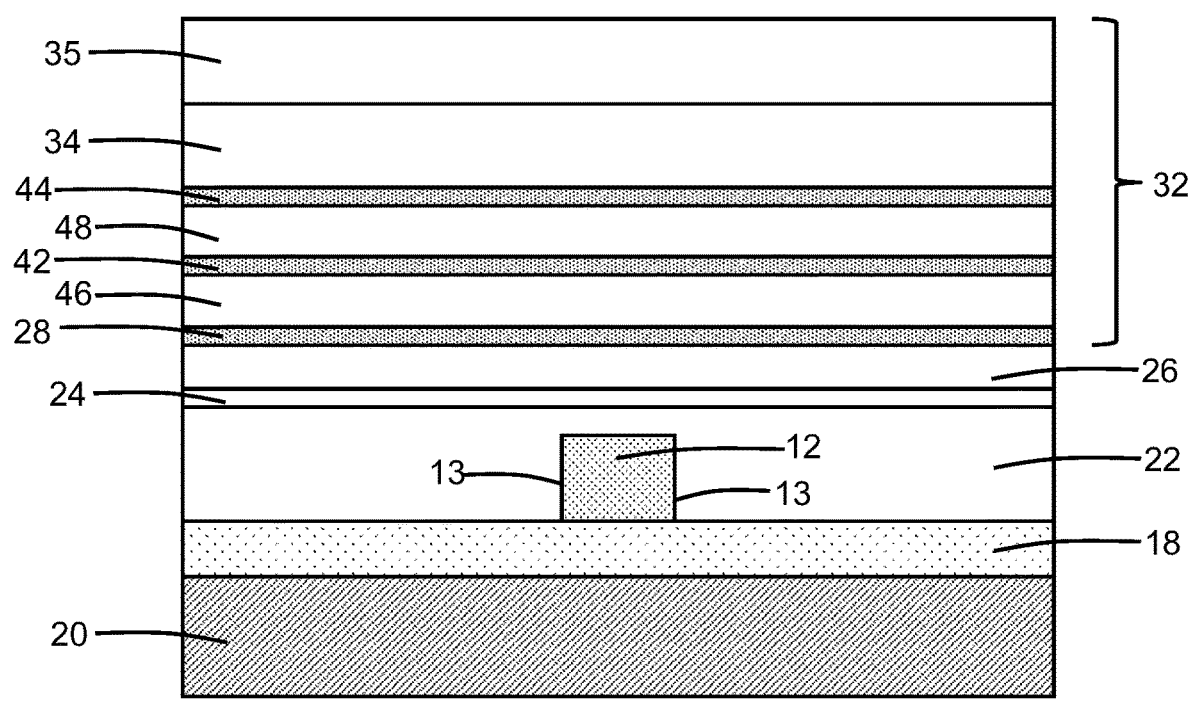
FIG. 5 is a cross-sectional view of a structure in accordance with alternative embodiments of the invention.

With reference to FIG. 5 and in accordance with alternative embodiments of the invention, the back-end-of-line stack 32 may include additional heat spreader layers 42, 44 each similar to the heat spreader layer 28 that are formed over the waveguide core 12. In that regard, the heat spreader layers 42, 44 may be comprised of the same material, with the same properties, as the heat spreader layer 28. For example, in an embodiment, the heat spreader layers 42, 44 may also be comprised of diamond. In an embodiment, the heat spreader layers 42, 44 may each have a thickness ranging from about 10 nanometers to about 200 nanometers. In an embodiment, the heat spreader layers 42, 44 may be planar layers with a uniform thickness between respective planar top and bottom surfaces.

A dielectric layer 46 may be formed between the top surface of the heat spreader layer 28 and the bottom surface of the heat spreader layer 42, and a dielectric layer 48 may be formed between the top surface of the heat spreader layer 42 and the bottom surface of the heat spreader layer 44. The dielectric layers 46, 48 may be comprised of a dielectric material, such as silicon dioxide. The layer stack including the heat spreader layers 28, 42, 44 and the dielectric layers 46, 48 is positioned to overlap with the waveguide core 12. The heat spreader layers 28, 42, 44 alternate in a vertical direction with the dielectric layers 46, 48 such that the composition alternates between a material of comparatively-high thermal conductivity and a material of comparatively-low thermal conductivity. In an embodiment, the dielectric layers 46, 48 may fully separate the heat spreader layers 28, 42, 44 from each other. The heat spreader layers 28, 42, 44 and the dielectric layers 46, 48 may constitute a metamaterial that acts as a homogeneous material characterized by a composite refractive index of the different materials.

In an embodiment, the heat spreader layers 28, 42, 44 may have the same thickness. In an embodiment, the pitch and duty cycle of the heat spreader layers 28, 42, 44 may be uniform to define a periodic arrangement. In alternative embodiments, the pitch and/or the duty cycle of the pitch and duty cycle of the heat spreader layers 28, 42, 44 may be apodized (i.e., non-uniform) to define a non-periodic arrangement.

The additional heat spreader layers 42, 44 of high thermal conductivity may permit closer placement in a vertical direction of the heat spreader layer 28 to the waveguide core 12, which may enable more efficient cooling. The multi-layer stack of heterogenous materials (e.g., diamond layers alternating with silicon dioxide layers) may permit a reduction in the footprint of the optical component (e.g., the waveguide core 12) when designed to handle light of transverse magnetic mode by enhancing confinement and other mode properties. For example, the heat spreader layers 28, 42, 44 may reduce bending loss of light having the transverse magnetic mode if the waveguide core 12 is curved.

Figure 6:
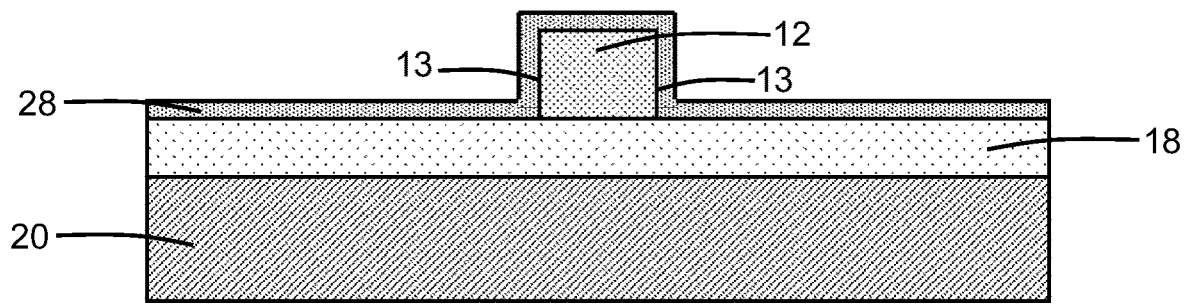
FIG. 6 is a cross-sectional view of a structure in accordance with alternative embodiments of the invention.

With reference to FIG. 6 and in accordance with alternative embodiments of the invention, the heat spreader layer 28 may be applied as a conformal coating that is in contact with the exterior surfaces 13 of the waveguide core 12 and with the dielectric layer 18. In an embodiment, the heat spreader layer 28 may be positioned in direct contact with the exterior surfaces 13 of the waveguide core 12. The heat spreader layer 28 conforms to the contour of the waveguide core 12 with a thickness that is the same or approximately the same on each exterior surface 13. The dielectric layers 22, 24, 26 and the back-end-of-line stack 32 may be formed subsequent to the formation of the heat spreader layer 28.

Figure 7:
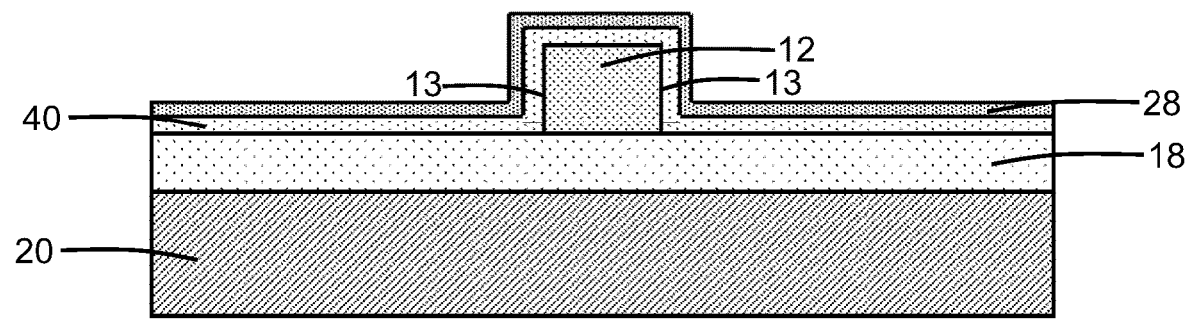
FIG. 7 is a cross-sectional view of a structure in accordance with alternative embodiments of the invention.

With reference to FIG. 7 and in accordance with alternative embodiments of the invention, a dielectric layer 40 may be applied as a conformal coating that is in contact with the exterior surfaces 13 of waveguide core 12 and with the dielectric layer 18 before the heat spreader layer 28 is applied as a conformal layer. In an embodiment, the dielectric layer 40 may be comprised of a dielectric material, such as silicon dioxide, that has a lower thermal conductivity than the material constituting the heat spreader layer 28. The dielectric layer 40 is disposed between the heat spreader layer 28 and the exterior surfaces 13 of the waveguide core 12. The heat spreader layer 28 and dielectric layer 40 each conform to the contour of the waveguide core 12 with respective thicknesses that are same or approximately the same on each exterior surface 13. The dielectric layers 22, 24, 26 and the back-end-of-line stack 32 may be formed subsequent to the formation of the heat spreader layer 28 and dielectric layer 40.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a substrate;
    an optical component including a waveguide core, the waveguide core comprising a first material having a first thermal conductivity; and
    a back-end-of-line stack including a first heat spreader layer, the first heat spreader layer comprising a second material having a second thermal conductivity that is greater than the first thermal conductivity of the first material,
    wherein the optical component is positioned in a vertical direction between the substrate and the back-end-of-line stack.

2. The structure of claim 1 wherein the optical component is an edge coupler.

3. The structure of claim 1 wherein the first material is silicon, and the second material is diamond.

4. The structure of claim 1 further comprising:
    a first dielectric layer positioned in the vertical direction between the first heat spreader layer and the optical component.

5. The structure of claim 4 wherein the back-end-of-line stack includes a second heat spreader layer comprising the second material, and the optical component is positioned in the vertical direction between the substrate and the second heat spreader layer.

6. The structure of claim 5 further comprising:
    a second dielectric layer positioned in the vertical direction between the first heat spreader layer and the second heat spreader layer.

7. The structure of claim 6 wherein the first dielectric layer and the second dielectric layer comprise silicon dioxide, the first material is silicon, and the second material is diamond.

8. The structure of claim 4 wherein the first dielectric layer comprises a third material having a third thermal conductivity that is less than the second thermal conductivity.

9. The structure of claim 1 wherein the waveguide core includes a first section and a second section, and the first heat spreader layer overlaps with only the first section of the waveguide core.

10. The structure of claim 9 wherein the first heat spreader layer includes a taper that overlaps with the first section of the waveguide core.

11. A method comprising:
    forming a first heat spreader layer; and
    forming an optical component that is positioned in a vertical direction between a substrate and the first heat spreader layer,
    wherein the optical component includes a waveguide core, the waveguide core comprises a first material having a first thermal conductivity, and the first heat spreader layer comprises a second material having a second thermal conductivity that is greater than the first thermal conductivity.

12. The method of claim 11 further comprising:
    forming a first dielectric layer positioned in the vertical direction between the first heat spreader layer and the optical component.

13. The method of claim 12 wherein the first heat spreader layer is positioned in a back-end-of-line stack, the back-end-of-line stack includes a second heat spreader layer adjacent to the waveguide core of the optical component, the second heat spreader layer comprises the second material, and the first heat spreader layer is positioned in the vertical direction between the first dielectric layer and the second heat spreader layer.

14. The method of claim 13 further comprising:
    forming a second dielectric layer positioned in the vertical direction between the first heat spreader layer and the second heat spreader layer.

15. The method of claim 12 wherein the first material is silicon, and the second material is diamond.

16. The method of claim 12 wherein the waveguide core has a plurality of external surfaces, and the first heat spreader layer is a conformal coating on the plurality of external surfaces.

17. The structure of claim 1 wherein the second thermal conductivity of the second material is greater than about 150 W/m-K.

18. The structure of claim 1 wherein the second thermal conductivity of the second material is greater than about 400 W/m-K.

19. The structure of claim 1 wherein the second thermal conductivity of the second material is greater than about 1000 W/m-K.

20. The structure of claim 1 wherein the second thermal conductivity of the second material is within a range of about 2000 W/m-K to about 2400 W/m-K.

* * * * *